United States Patent [19]

Kim

[11] Patent Number: 5,637,212

[45] Date of Patent: Jun. 10, 1997

[54] DRY CLEANING WASTE WATER TREATMENT MACHINE HAVING RECIRCULATING ARRANGEMENT

[76] Inventor: Randy Kim, 7912 Sea Pines Rd., Orland Park, Ill. 60462

[21] Appl. No.: 506,719

[22] Filed: Jul. 26, 1995

[51] Int. Cl.[6] .................................................. B01D 36/00
[52] U.S. Cl. ..................... 210/195.1; 68/18 R; 210/104; 210/138; 210/182; 210/258; 210/259
[58] Field of Search ................................ 68/18 C, 18 R, 68/18 F, 18 D; 210/97, 104, 138, 141, 143, 149, 167, 180, 182, 194, 195.1, 196, 257.1, 258, 259, 262, 266, 314, 335, 109, 513, 134

[56] References Cited

U.S. PATENT DOCUMENTS

| | | | |
|---|---|---|---|
| 3,977,218 | 8/1976 | Zucchini | 68/18 R |
| 4,086,705 | 5/1978 | Wehr | 68/18 R |
| 4,281,465 | 8/1981 | Zimmerman et al. | 68/18 C |
| 4,354,364 | 10/1982 | Holder et al. | 68/18 R |
| 4,513,590 | 4/1985 | Fine | 68/18 C |
| 4,780,218 | 10/1988 | Kohler . | |
| 4,879,888 | 11/1989 | Suissa | 210/167 |
| 5,076,936 | 12/1991 | Metz . | |
| 5,236,580 | 8/1993 | Kelleher | 210/104 |
| 5,488,842 | 2/1996 | Nishioka et al. | 68/18 R |
| 5,525,213 | 6/1996 | Phillips | 210/167 |

*Primary Examiner*—Joseph W. Drodge
*Attorney, Agent, or Firm*—Ernest Kettelson

[57] ABSTRACT

A waste water treatment machine for use primarily with dry cleaning equipment to remove the solvent perchlorethylene and other contaminants from waste water so the purified water can be returned to the environment. The machine includes a collecting tank to collect waste water from both a dry cleaning machine and a dry cleaning vacuum press which vacuum waste water and solvent from garments that still remains therein after the dry cleaning operation is completed. The treatment machine pumps the collected waste water through filters and an elevated separation tank wherein the heavier than water perchlorethylene separates from the water, the machine having a re-circulation conduit through which the partially purified water above a separation level in the separation tank can flow by gravity back down for re-circulation through the filters and then pumped up again to the separation tank for additional filtering and separation of the solvent and other contaminants. The waste water can be re-circulated as many times as needed to purify the water, after which it is flowed to a heating chamber for vaporizing and discharge to the atmosphere as steam.

19 Claims, 3 Drawing Sheets

DRY CLEANING WASTE WATER TREATMENT MACHINE HAVING RECIRCULATING ARRANGEMENT

BACKGROUND OF THE INVENTION

This invention relates to the field of waste water treatment machines that remove impurities and toxic materials from a water solution used in an industrial or commercial process such as dry cleaning of fabric materials, so that when removed the purified water may be returned to the ground in liquid form or to the atmosphere in the form of steam. The invention relates primarily to purifying waste water collected after use in dry cleaning equipment in which one of the chemical materials to be removed from the waste water is perchlorethylene.

Prior art of which the inventor is aware include those machines and apparatus disclosed in the following United States patents.

U.S. Pat. No. 5,266,208 discloses a system and method for cleaning waste water having at least an insoluble organic contaminant, a volatile hydrocarbon contaminant and a dissolved hydrocarbon contaminant, including the steps of forming a multiliquid phase system including an aqueous hydrocarbon-contaminated layer and isolating said aqueous hydrocarbon-contaminated layer from said multi-phase liquid system, reducing the concentration of volatile hydrocarbon contaminant by stripping and removing insoluble organic contaminant in said aqueous hydrocarbon contaminated layer by absorption to form a dissolved hydrocarbon contaminated waste water, reducing the concentration of dissolved hydrocarbon contaminant in said dissolved hydrocarbon contaminated waste water by absorption, and discharging the treated water.

U.S. Pat. No. 5,236,580 discloses a device for reclaiming dry cleaning solvent from a dry cleaning machine, comprising an evaporator, a fluid transfer mechanism to transport evaporated fluid through a filter to remove substantially all of the solvent. The solvent can also be filtered before it enters the evaporator.

U.S. Pat. No. 5,223,126 discloses a system for decontaminating dry cleaning waste water, comprising a storage tank in which a portion of the dry cleaning solvent and particulate matter settle to the bottom, a pump to pump waste water from the storage tank to first filter means to remove the remaining particulate matter and then to second filter means to remove the remaining solvent, and evaporator means to evaporate the decontaminated waste water.

U.S. Pat. No. 5,090,221 discloses a continuous water wash apparatus and method for cleaning radioactively contaminated garments, which includes a wash water system and a rinse water system, both having water polishers for removing dissolved radionucleides from the clothing.

U.S. Pat. No. 5,076,936 discloses a system for removing radioactive contaminants from liquid hazardous material such as oil, including recirculating the material between a processing tank and a filter, heating the material to increase viscosity, adding chelating agents to enhance removal of the radioactive elements, adding water in a settling tank to wash the liquid hazardous material, and passing through a pre-filter stage, mid-range filter stage and a finishing-filter stage in the outlet from the main processing tank.

U.S. Pat. No. 4,780,218 discloses a process for recovering perchlorethylene from the waste water after use in a dry cleaning machine, comprising diversion of contaminated perchlorethylene from the water separator, transferring to a still, diverting steam from a boiler through filter cartridges to strip perchlorethylene therefrom, directing such steam with perchlorethylene to the sweep input of the still and discarding excessive water from the separator.

U.S. Pat. No. 4,637,232 discloses apparatus for recycling solvent used in dry cleaning machines, comprising a pre-distallation unit between a main distillation chamber and a condensor, consisting of a tank to receive mingled water and solvent from the cleaning cycle which it discharges into the chamber in controlled fashion and a heat exchanger in the tank in receipt of vapor from the chamber which it channels to the condensor.

U.S. Pat. No. 4,513,590 discloses a combination filter apparatus for use with a dry cleaning machine, comprising a plurality of filter cartridges, an adsorber containing a bed of activated charcoal pellets, a condensor and a solvent-water separator mounted on a still housing. Steam is passed through the filters and charcoal bed to strip the solvent therefrom, then directed into the condensor to condense into liquid form, after which it is flowed to the water-solvent separator where the solvent condensate is separated from the water.

U.S. Pat. No. 4,354,364 discloses a dry cleaning system which captures and re-circulates portions of the cleaning solvent, such as perchlorethylene, as it is being operated.

U.S. Pat. No. 4,086,705 discloses another dry cleaning system which recovers part of the cleaning solvent during operation of the dry cleaning machine.

U.S. Pat. No. 3,451,234 discloses a liquid separator for recovering solvent from a dry cleaning machine, comprising a tank divided into two sections wherein liquid from one section can overflow the partition to the other section. A float is on one side of the partition to detect the solvent level which is flowed through a restricted outlet. On the other side of the partition is an unrestricted solvent outlet and a water outlet which determines the maximum water level.

U.S. Pat. No. 3,269,155 discloses a dry cleaning machine and separating device which as part of the drying cleaning operation and at the end of the cycle, vaporizes the cleaning solvent, blows it into a condensor where it is cooled and returned to its liquid phase, then separated from water for re-use of the solvent.

SUMMARY OF THE INVENTION

The present invention provides an improved waste water treatment machine, particularly for purifying waste water after being used (1) in a dry cleaning machine and (2) in a vacuum press wherein waste water that remains in garments or fabrics after the dry cleaning operation is "sucked out" by a vacuum as they are being pressed.

The waste water treatment machine in accordance with this invention may be permanently connected to the dry cleaning machine and to the vacuum press by respective waste water conduits leading from each, wherein the waste water from each is received in a collecting tank. The waste water treatment machine operates automatically to purify the waste water by removing particulate matter and perchlorethylene, after which the purified water is automatically flowed into a heating chamber where it is vaporized and allowed to then escape into the atmosphere as steam.

The perchlorethylene that is removed from the waste water is collected in a separation chamber from which it may be drained after a sufficient amount has been accumulated. It may then be re-used.

The waste water treatment machine in accordance with this invention includes a receiving tank to receive the waste water from the dry cleaning machine and vacuum press, a first pump to pump waste water from the receiving tank to a processing tank, a second pump to pump waste water from said processing tank through a fiber filter to remove particulate matter, through a carbon filter to remove some of the perchlorethylene and other contaminants, and then up to a separation tank positioned above the processing tank.

The separation tank includes a specific separation level, at or above which all waste water inlets and outlets are positioned. Since perchlorethylene is heavier than water, it separates from the water in the separation tank and settles below the separation level down to the bottom of the separation tank.

The waste water at and above the separation level of the separation tank is re-circulated back to the processing tank, through the filters and again up to the separation tank for additional filtering and separation of particulate matter and perchlorethylene from the waste water as many times as necessary to purify the water. The number of times the waste water has to be re-circulated to purify it is determined by testing it during an initial testing operation. Once that is determined a timer is set to open a valve in a purified water conduit leading from the separation chamber to a heating chamber after the amount of time has expired for the number of necessary re-circulations to have taken place. The machine will then operate automatically to flow the purified water after each such time period to the heating chamber where it is heated to the boiling point and escapes to the atmosphere as steam.

The waste water in the separation tank above the separation level is recirculated back to the processing tank and filters through a recirculating conduit whose open upper end extends upwardly through the bottom wall of the separation tank and terminates at the separation level. Thus, only the waste water at and above such level, from which perchlorethylene has settled below such level, can enter the recirculating conduit for additional filtering and additional separation of perchlorethylene and other contaminants from the waste water.

The outlet aperture which opens to the purified water conduit leading from the separation tank to the heating chamber is located above the separation level of the separation tank. The inlet aperture opening to the separation tank to which the conduit leading upwardly from the filters and processing tank is connected is also positioned above the separation level of the separation tank.

A perchlorethylene discharge valve is provided which opens below the separation level of the separation tank to periodically drain perchlorethylene therefrom after a sufficient amount has accumulated. The perchlorethylene can then be re-used.

DESCRIPTION OF PREFERRED EMBODIMENT

Figure 1:
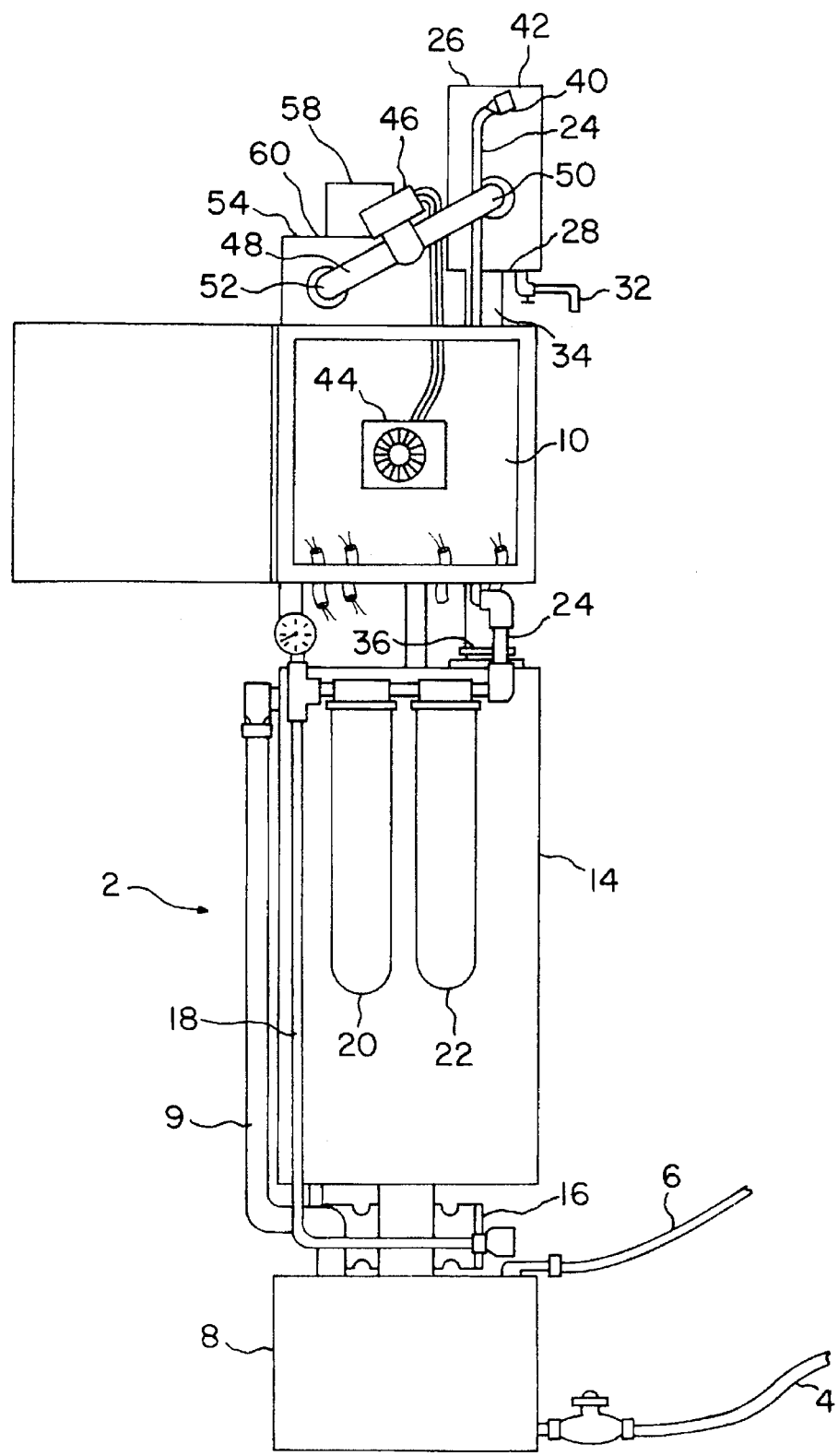
FIG. 1 is a front elevation view of the waste water treatment machine in accordance with this invention.
Figure 2:
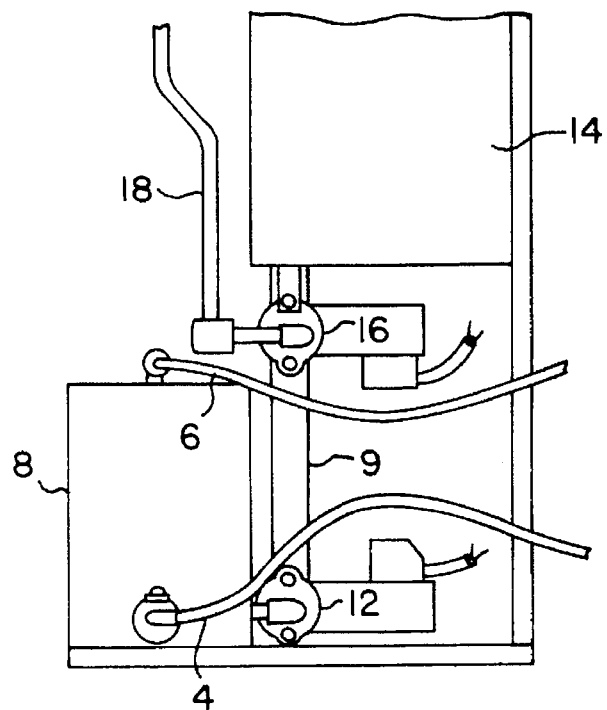
FIG. 2 is a side elevation view of the lower portion of the water treatment machine shown in FIG. 1, taken from the right side, to show components not seen in the front view, such as an additional pump.
Figure 3:
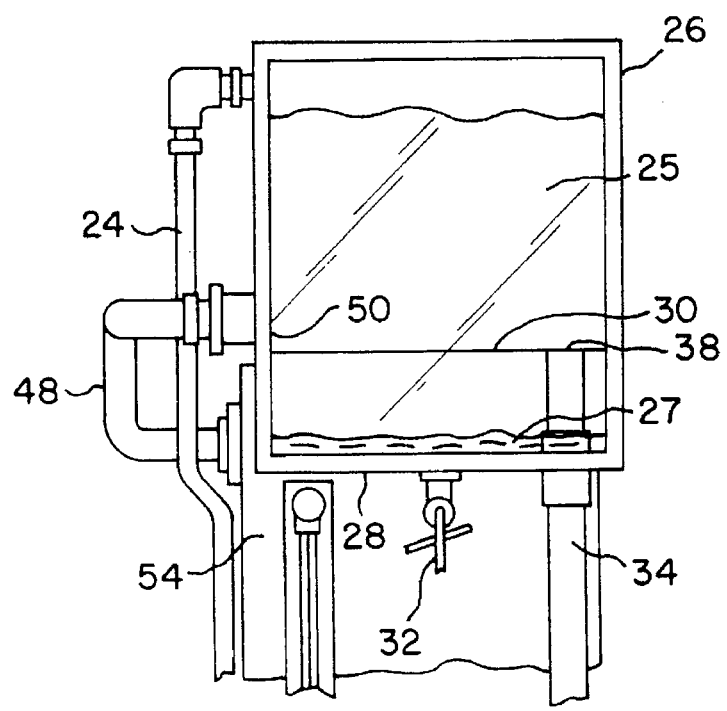
FIG. 3 is a side elevation view of the upper portion of the water treatment machine shown in FIG. 1, taken from the right side, to illustrate in particular the inside of the separation tank and for that purpose the side wall is shown as a transparent glass wall.
Figure 4:
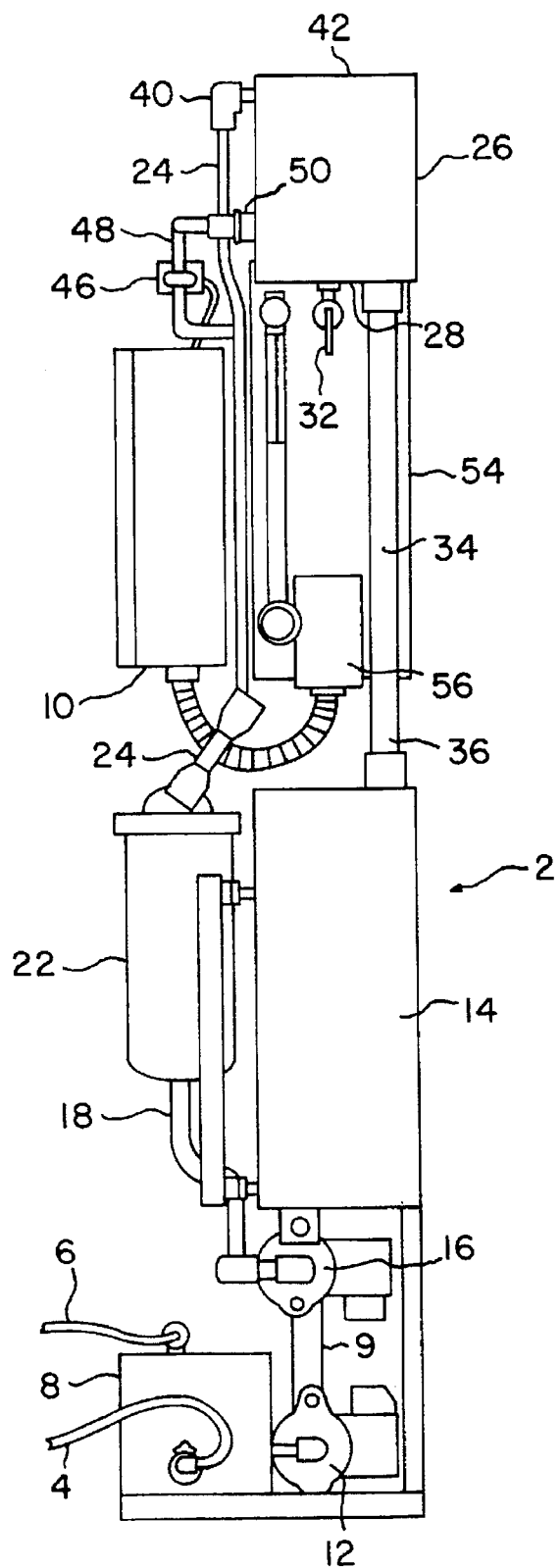
FIG. 4 is a side elevation view of the waste water treatment machine shown in FIG. 1 taken from the right side, to show additional components not visible in other views, such as a portion of the heating element in the heating chamber and its connection to the control system.

A waste water treatment machine 2 in accordance with this invention to separate perchlorethylene, used in dry cleaning, from waste water is described as follows.

During the dry cleaning process, clothing is first immersed and bathed in the dry cleaning solution which includes perchlorethylene and water. After use in a dry cleaning operation, that waste water/perchlorethylene solution is collected in a drain tank for discharge through conduit 4 to the waste water treatment machine 2 in accordance with this invention.

After the clothing has been cleaned by being immersed and bathed in the dry cleaning solution, it is removed and taken to a garment vacuum press which both presses the garment and applies a vacuum to draw out whatever waste water and perchlorethylene solution remains in the garment. This waste water solution removed by the vacuum press is also collected in a drain tank for discharge through conduit 6 to the waste water treatment machine.

The conduits 4 and 6 leading from the respective waste water drain tanks of the dry cleaning machine and vacuum press are connected to the waste water collecting tank 8 of the waste water treatment machine 2.

An electronic control system and control circuit 10 controls operation of sensors, pumps, timers, a heating element and other components which are connected in the control circuit 10 and are described in more detail herein below.

A first sensor is located in the waste water collecting tank 8 to sense when waste water collected therein reaches a predetermined level. When that level is reached, the first sensor provides a signal to the control system 10 to energize the motor of a first pump 12 connected to pump waste water from the collecting tank 8 upwardly through conduit 9 to a processing tank 14.

A second sensor is located in the processing tank 14 to sense when the waste water received therein reaches a predetermined level. When that level is reached, the second sensor provides a signal to the control system 10 to energize the motor of a second pump 16 connected to pump waste water from the processing tank 14 into a processing line comprising conduit 18, a first or fiber filter cartridge 20 having a cotton fiber filter element therein and a second or carbon filter cartridge 22 having a carbon filter element therein.

The second pump 16 pumps the waste water/ perchlorethylene solution through the conduit 18, fiber filter 20 and carbon filter 22 which removes some of the perchlorethylene from the waste water solution. After passing through fiber and carbon filters, the waste water solution is pumped upwardly through conduit 24 by the second pump 16 to a separating tank 26 mounted above the processing tank 14.

The separating tank 26 separates perchlorethylene from water as follows. The waste water solution 25 is allowed to settle in the separating tank 26 whereupon perchlorethylene 27 which is heavier than water settles toward the bottom wall 28 of the tank 26. When collected perchlorethylene in the lower portion of the separating tank 26 approaches level 30 which is parallel to and spaced apart upwardly from horizontally extending bottom wall 28, the perchlorethylene is drained out of the separating tank 26 through the discharge conduit 32.

The perchlorethylene which settles to the bottom of separating tank 26 is a relatively small quantity relative to the amount of waste water solution passing into and out of the separating tank 26. For example, for every five gallons of waste water circulated and recirculated through separating tank 26, only about five ounces of perchlorethylene will settle and collect at the bottom of separating tank 26. Therefore, the waste water treatment machine may be operated for a considerable period of time before enough perchlorethylene has collected to reach the level 30 in tank 26.

When the perchlorethylene is drained from the separating tank 26, the machine is stopped temporarily so no waste water is being pumped into the tank 26 while the discharge conduit 32 is open to drain out the collected perchlorethylene. The drained out perchlorethylene can be reused.

Waste water above the level 30 from which perchlorethylene has been allowed to settle toward the bottom 28 is drained from the separating tank 26 for recirculation therethrough by a recirculating conduit 34 which leads back to the processing tank 14 and to which end 36 of recirculating conduit 34 is connected. The opposite end 38 extends upwardly through the bottom wall 28 of the separating tank 26 to level 30 therein. The end 38 of recirculating conduit 34 opens to or above level 30 and the portion of separating tank 26 above level 30. The waste water solution in tank 26 above its level 30 thus flows into the recirculating conduit 34 through its open end 38 and downwardly by gravity into the processing tank 14 through end 36 which opens to the chamber of processing tank 14.

The recirculating waste water solution with some of the perchlorethylene removed as it passes through the separating tank 26 then is pumped again out of processing tank 14 through the processing conduit 18, fiber filter cartridge 20 and carbon filter cartridge 22 by second pump 16 and then back up through conduit 24 to again enter separating tank 26. Conduit 24 is connected at its upper end 40 to separating tank 26 adjacent the top wall 42 of tank 26, so waste water entering the separating tank 24 enters near the top and is allowed to settle toward the bottom.

Each time the waste water is recirculated through the fiber filter cartridge 20, carbon filter cartridge 22 and separating tank 26, more perchlorethylene is removed from the waste water solution. The waste water may be allowed to recirculate as long as necessary until all of the perchlorethylene has been removed.

When the number of times waste water has to be recirculated to remove all perchlorethylene has been determined and the time needed to accomplish that number of recirculations has been determined, a timer 44 connected to control system 10 for operation of electronic valve 46 also connected to and controlled by control system 10, signals control system 10 to open valve 46 in separating tank outlet conduit 48 to drain purified water from above level 30 in separating tank 26.

The outlet conduit 48 is connected at end 50 to separating tank 26 at a location above level 30, that is above the level at which the settled out perchlorethylene is allowed to accumulate in the separating tank 26. Outlet conduit 48 is connected at its opposite end 52 to a heating chamber 54 having an electric heating element 56 therein. Purified water from the separating tank 26 flows through conduit 48 when valve 46 is opened and into the heating chamber 54. Such water is then heated to a temperature above the boiling point whereupon it vaporizes and is allowed to escape as steam through outlet vent 58 opening to the top wall 60 of the heating chamber 54. A third sensor is located in the heating chamber and connected in the control circuit 10 to energize the heating element 56 when purified water is flowed into the heating chamber for vaporizing and discharge into the atmosphere as steam.

A typical amount of time for waste water to recirculate through the separating tank 26, fiber filter 20 and carbon filter 22 until all of the perchlorethylene has been separated from the water is for example one and a half hours. Thus, the timer 44 may be set to open valve 46 every one and a half hours to flow purified water from separating tank 26 to the heating chamber 54 for heating, vaporizing and discharge to the atmosphere.

Accumulated perchlorethylene at the bottom of the separating tank 26 will not begin to approach level 30 therein for a more extended period of time. In the example given above wherein only about five ounces of perchlorethylene will be accumulated for every five gallons of waste water processed until purified, the perchlorethylene would not have to be drained more than about once a week in a typical installation and normal use.

I claim:

1. A waste water treatment machine to separate pollutants from water, comprising conduit means to receive waste water having pollutants therein and to flow said waste water through said treatment machine, pump means to pump said waste water through said conduit means, filter means connected in said conduit means to filter some of the pollutants out of the said waste water, said waste water including a pollutant therein which is heavier than water, separation means connected in said conduit means for separating said pollutant which is heavier than water from said waste water, said separation means including a separation container to receive waste water having said pollutant therein which is heavier than water, said separation container having a bottom wall extending substantially parallel to a horizontal plane, said separation container having a separation level spaced apart upwardly from said bottom wall and extending substantially parallel to said horizontal plane wherein quantities of said pollutant which is heavier than water settle below said separation level, a waste water inlet aperture in said container located above said separation level, waste water outlet aperture means in said container having a waste water outlet aperture opening to said separation level and to said separation container above said separation level to flow waste water at and above said separation level out therefrom after quantities of said pollutant which is heavier than water have settled below said separation level, and purified water outlet means having a purified water outlet aperture opening to said separation container proximate to and above said separation level and arranged for draining purified water out from said container after substantially all pollutants have been removed therefrom by said filter means and said separation means, said waste water treatment machine including recirculating means for recirculating said waste water through said filter means and said separation means until substantially all pollutants have been removed from said waste water, said waste water outlet aperture of said waste water aperture means of said separation container of said separation means opening to said recirculating means to flow waste water thereinto for recirculating through said filter means and said separation means.

2. A waste water treatment machine as set forth in claim 1, including a waste water receiving tank connected in said conduit means to receive waste water having pollutants therein, said conduit means including a first inlet conduit leading from a dry cleaning machine to carry waste water having perchlorethylene comprising said heavier than water pollutant therein from said dry cleaning machine to said waste water receiving tank, said waste water receiving tank having a first inlet aperture, said first inlet conduit being connected to said first inlet aperture of said waste water receiving tank.

3. A waste water treatment machine as set forth in claim 2, wherein said conduit means includes a second inlet conduit leading from a dry cleaning vacuum press to carry waste water having perchlorethylene comprising said heavier than water pollutant therein from said dry cleaning vacuum press to said waste water receiving tank, said waste water receiving tank having a second inlet aperture, said second inlet conduit being connected to said second inlet aperture of said waste water treatment tank.

4. A waste water treatment machine as set forth in claim 3, including a processing tank, said conduit means including a receiving-tank-to-processing-tank conduit connected between said waste water receiving tank and said processing tank to carry waste water from said receiving tank to said processing tank, wherein said pump means includes a first pump, said first pump being connected in said conduit means to pump waste water from said waste water receiving tank to said processing tank.

5. A waste water treatment machine as set forth in claim 4, wherein said pump means includes a second pump, said filter means includes a first filter, said conduit means includes a processing-tank-to-filter-means conduit connected between said processing tank and said first filter to carry waste water from said processing tank to said first filter, said second pump being connected in said conduit means to pump waste water from said processing tank to said first filter.

6. A waste water treatment machine as set forth in claim 5, wherein said first filter includes a first filter cartridge and a fiber filter element therein.

7. A waste water treatment machine as set forth in claim 5, including an electronic control circuit, a first sensor connected in said control circuit and located in said waste water receiving tank to sense when a pre-determined quantity of waste water has been received therein and to thereupon signal said control circuit to energize said first pump connected in said control circuit to pump waste water out from said waste water receiving tank and into said processing tank, a second sensor connected in said control circuit and located in said processing tank to sense when a pre-determined quantity of waste water has been received therein and to thereupon signal said control circuit to energize said second pump connected in said control circuit to pump waste water out from said processing tank and to said first filter through said processing-tank-to-filter-means conduit.

8. A waste water treatment machine as set forth in claim 2, wherein said separation container includes a drain outlet and drain valve adjacent its said bottom wall to drain said heavier than water perchlorethylene therefrom when a sufficient quantity has accumulated in said separation container below said separation level thereof to warrant draining said perchlorethylene therefrom.

9. A waste water treatment machine to separate pollutants from water, comprising conduit means to receive waste water having pollutants therein and to flow said waste water through said treatment machine, pump means to pump said waste water through said conduit means, filter means connected in said conduit means to filter some of the pollutants out of the said waste water, said waste water including a pollutant therein which is heavier than water, separation means connected in said conduit means for separating said pollutant which is heavier than water from said waste water, said separation means including a separation container to receive waste water having said pollutant therein which is heavier than water, said separation container having a bottom wall extending substantially parallel to a horizontal plane, said separation container having a separation level spaced apart upwardly from said bottom wall and extending substantially parallel to said horizontal plane, a waste water inlet aperture in said container located above said separation level, waste water outlet aperture means in said container having a waste water outlet aperture opening to said separation level and to said separation container above said separation level to flow waste water at and above said separation level out therefrom after quantities of said pollutant which is heavier than water have settled below said separation level, and purified water outlet means having a purified water outlet aperture opening to said separation container above said separation level to flow purified water out from said container after substantially all pollutants have been removed therefrom by said filter means and said separation means, said waste water treatment machine including recirculating means for recirculating said waste water through said filter means and said separation means until substantially all pollutants have been removed from said waste water, said waste water outlet aperture of said waste water aperture means of said separation container of said separation means opening to said recirculating means to flow waste water thereinto for recirculating through said filter means and said separation means, including a waste water receiving tank connected in said conduit means to receive waste water having pollutants therein, said conduit means including a first inlet conduit leading from a dry cleaning machine to carry waste water having perchlorethylene comprising said heavier than water pollutant therein from said dry cleaning machine to said waste water receiving tank, said waste water receiving tank having a first inlet aperture, said first inlet conduit being connected to said first inlet aperture of said waste water receiving tank, wherein said conduit means includes a second inlet conduit leading from a dry cleaning vacuum press to carry waste water having perchlorethylene comprising said heavier than water pollutant therein from said dry cleaning vacuum press to said waste water receiving tank, said waste water receiving tank having a second inlet aperture, said second inlet conduit being connected to said second inlet aperture of said waste water treatment tank, including a processing tank, said conduit means including a receiving-tank-to-processing-tank conduit connected between said waste water receiving tank and said processing tank to carry waste water from said receiving tank to said processing tank, wherein said pump means includes a first pump, said first pump being connected in said conduit means to pump waste water from said waste water receiving tank to said processing tank, and wherein said pump means includes a second pump, said filter means includes a first filter, said conduit means includes a processing-tank-to-filter-means conduit connected between said processing tank and said first filter to carry waste water from said processing tank to said first filter, said second pump being connected in said conduit means to pump waste water from said processing tank to said first filter, and further wherein said filter means includes a second filter, said conduit means includes a first-filter-to-second filter conduit connected between said first filter and said second filter to carry partially filtered waste water from said first filter to said second filter, said second pump being connected in said conduit means to pump partially filtered waste water from said first filter to said second filter.

10. A waste water treatment machine as set forth in claim 9, wherein said second filter includes a second filter cartridge and carbon filter means in said second filter cartridge.

11. A waste water treatment machine as set forth in claim 9, wherein said conduit means includes a filter-means-to-separation-container conduit connected between said second filter and said waste water inlet aperture of said separation container to carry filtered waste water from said second filter to said separation container, said second pump being connected in said conduit means to pump filtered waste water from said second filter to said waste water inlet aperture of said separation container.

12. A waste water treatment machine as set forth in claim 11, wherein said recirculating means includes a separation-tank-to-processing-tank conduit, said separation-tank-to-processing-tank conduit having a first end portion extending upwardly through said bottom wall of said separation container to said separation level of said separation container, said first end portion of said separation-tank-to-processing-tank conduit terminating at a first open end wall comprising said waste water outlet aperture opening to said separation level and to the portions of said separation container above said separation level, said separation-tank-to-processing-tank conduit having an opposite second open end wall connected to and opening to said processing tank for carrying partially filtered and partially separated waste water from said separation tank to said processing tank for re-circulating through said first and second filters and back to said separation container for additional filtering and additional separation of said pollutant which is heavier than water.

13. A waste water treatment machine as set forth in claim 12, wherein said separation container is mounted above said processing tank and said partially filtered and separated waste water is carried back to said processing tank through said separation-tank-to-processing-tank conduit by gravity.

14. A waste water treatment machine as set forth in claim 13, including a heating chamber, said purified water outlet means including a separation-container-to-heating-chamber conduit connected between said purified water outlet aperture of said separation container and said heating chamber to carry purified water from said separation container to said heating chamber, a heating element in said heating chamber to heat said purified water when received therein to a temperature sufficient to vaporize said purified water, and a vent in said heating chamber for said vaporized purified water to escape to the atmosphere as steam.

15. A waste water treatment machine as set forth in claim 14, wherein said purified water outlet aperture of said separation container is above said heating chamber whereby said purified water is carried through said separation-container-to-heating-chamber conduit by gravity from said separation container to said heating chamber.

16. A waste water treatment machine as set forth in claim 14, including valve means connected in said separation-container-to-heating-chamber conduit operable between a valve open and a valve closed position to prevent flow from said separation container to said heating chamber when in its said valve closed position and to permit such flow when in its said valve open position.

17. A waste water treatment machine as set forth in claim 16, wherein said valve means comprises an electronic valve having an electronically controlled valve operator to operate said valve between its said valve open and valve closed positions, and a timer connected to said electronically controlled valve operator to signal said valve operator to operate said valve between said valve open and valve closed positions at whatever time intervals set by said timer.

18. A waste water treatment machine as set forth in claim 14, including an electronic control circuit, a first sensor connected in said control circuit and located in said waste water receiving tank to sense when a pre-determined quantity of waste water has been received therein and to thereupon signal said control circuit to energize said first pump connected in said control circuit to pump waste water out from said waste water receiving tank and into said processing tank, a second sensor connected in said control circuit and located in said processing tank to sense when a pre-determined quantity of waste water has been received therein and to thereupon signal said control circuit to energize said second pump connected in said control circuit to pump waste water out from said processing tank and to said first filter through said processing-tank-to-filter-means conduit, and a third sensor connected in said control circuit and located in said heating chamber to sense when a pre-determined quantity of purified water has been received therein and to thereupon signal said control circuit to energize said heating element connected in said control circuit to heat said purified water to a temperature sufficient to vaporize said purified water whereupon it can escape to the atmosphere as steam.

19. A waste water treatment machine as set forth in claim 18, including an electronic valve having an electronically controlled valve operator connected in said control circuit, said electronic valve being connected in said separation-container-to-heating-chamber conduit to control flow of purified water therethrough, a timer connected in said control circuit to signal said control circuit to energize operation of said electronically controlled valve operator for movement from a valve open to a valve closed position upon receipt of a valve closing signal and from a valve closed to a valve open position upon receipt of a valve opening signal, said first, second and third sensors, said electronic valve and its said electronically controlled valve operator, and said timer enabling continuous automatic operation of said waste water treatment machine when connected to a first waste water conduit leading from said dry cleaning machine and a second waste water conduit leading from said dry cleaning vacuum press.

* * * * *